United States Patent Office 2,724,205
Patented Nov. 22, 1955

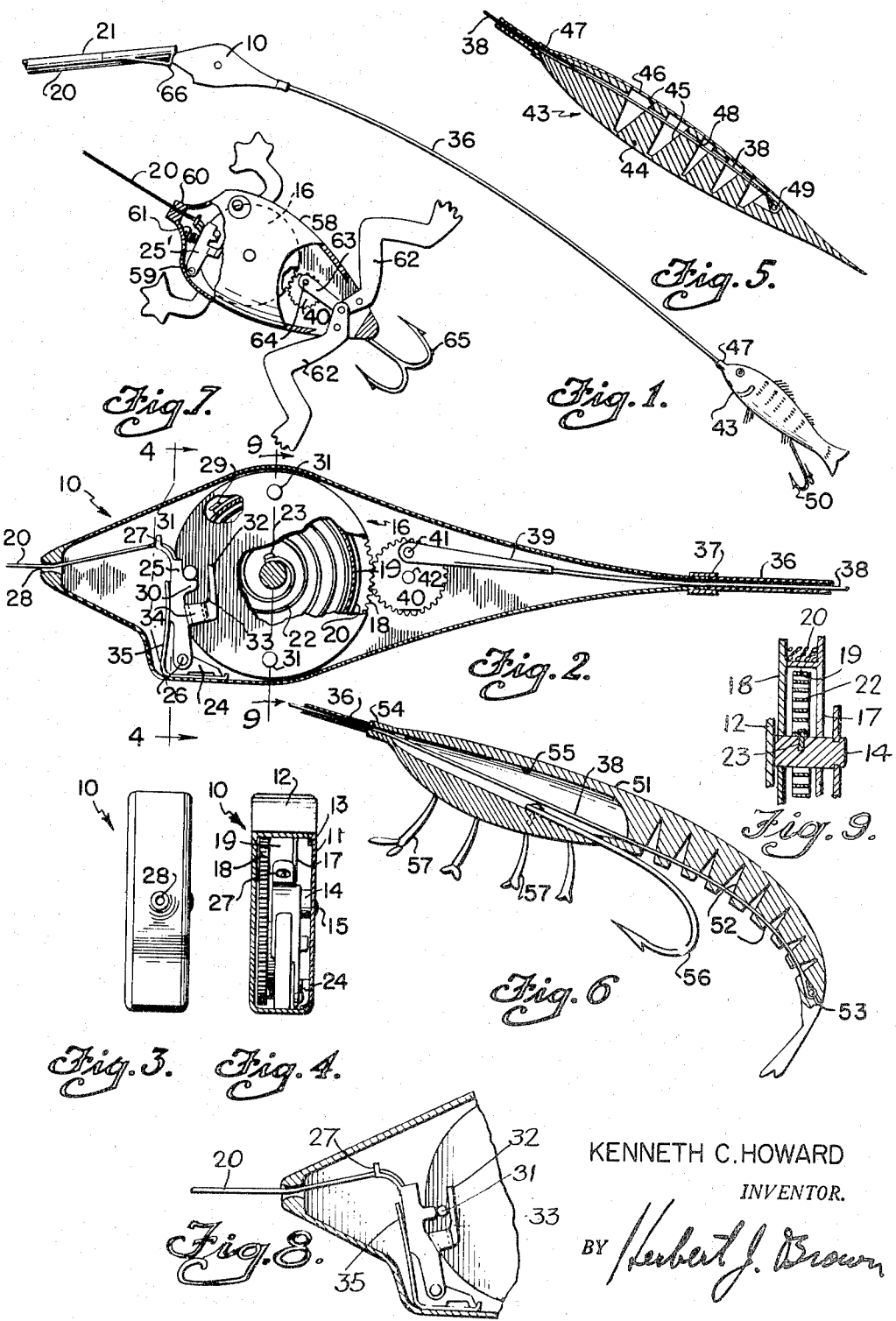

2,724,205

ANIMATED FISH LURE

Kenneth C. Howard, Fort Worth, Tex., assignor of one-third to C. S. Sykes, Fort Worth, Tex., and one-third to C. E. Ratcliff, Harvey, La.

Application May 2, 1952, Serial No. 285,597

5 Claims. (Cl. 43—26.2)

This invention relates to animated fish lures and has reference to improvements in mechanical devices which simulate the natural actions of live prey.

An object of the invention is to provide a fish lure of the described class having a spring motor or the like which will not become unwound when casting.

A particular object of the invention is to provide a lure having a spring motor therein which will operate at intervals at the will of the operator after the lure has reached the water.

A further object of the invention is to provide a mechanical fish lure having a spring motor or the like therein which may be wound by the reel on the rod with which the lure is used.

The form of the invention shown will be more readily understood by reference to the following description and the accompanying drawing, wherein:

Figure 1 is an elevation of a preferred embodiment of the invention attached to the line of a casting rod.

Figure 2 is a longitudinal sectional view of the housing shown in Figure 1, and wherein a wall thereof is broken away illustrating a preferred arrangement of parts therein.

Figure 3 is a front elevation of Figure 2.

Figure 4 is a sectional view taken approximately on lines 4—4 of Figure 2.

Figure 5 is a longitudinal sectional view of a flexible artificial minnow which may be used in connection with and form a part of the invention.

Figure 6 is a longitudinal sectional view of another type of artificial bait which may be used with and form a part of the invention, and Figure 7 is a broken sectional and plan view of a modified form of the invention wherein the mechanism of the present invention is embodied in a frog-like artificial lure.

Figure 8 is a fragmentary sectional view similar to Figure 2, but showing the escapement in its alternate or actuating position.

Figure 9 is a fragmentary sectional view taken on lines 9—9 of Figure 2.

The form of the invention illustrated in Figures 1 through 4 includes an elongated housing 10 which is tapered toward each end and having a base plate 11 and a hollow cover 12 secured thereto by any suitable means. As shown in Figure 4, there is an upstanding flange 13 for engaging the periphery of the cover 12.

Within the housing 10 there is an inwardly projecting stub shaft 14 which is secured to the base plate 11 by means of a rivet 15 or the like, and which shaft has a drum 16 mounted for free rotation thereon. The drum 16 is comprised of a disk 17 and a flat thin driving gear 18 which are secured to each other by means of a thin cylindrical member 19, the outside diameter of which is less than the outside diameter of the disk 17 or the gear 18, for receiving and winding the line 20 of a casting rod 21. A watch spring 22 is secured to the stub shaft 14 by means of a rivet 23, and the other end of the spring is secured by suitable means, not shown, to the inner surfaces of the cylindrical member 19.

Within one side of the housing 10 there is an escapement including a bracket 24 secured, by suitable means such as soldering or cementing, to the base plate 11 for pivotally supporting a trigger arm 25 at one end thereof by means of a pivot pin 26. The trigger arm 25 is arranged across the front central portion of the drum 16 and is provided with an eye 27 in its free end for receiving the line 20 from the casting rod 21. As shown in Figure 2 the line enters the forward end of the housing through an opening 28 therein, and after passing through the eye 27, is wound around the drum 16 where it is secured to a hook 29 projecting from the outer surface of the cylindrical member 19. Rearwardly of and integral with the arm 25, and located near the longitudinal center of the housing 10, there is a shoulder 30 arranged to engage stops 31 projecting from the outer surface of the disk 17. All of the stops 31 are equi-distance from the center of the disk and are preferably equally spaced from each other. Also integral with the trigger arm 25 is a rearwardly and angularly formed finger 32 between the shoulder 30 of the arm 25 and the latter's pivot pin 26. The finger is shaped to provide an arcuate cam 33 between its ends, and the portion of the finger adjacent the trigger arm 25 is outwardly projected in the form of an arcuate bend 34 and arranged to permit the projecting stops 31 to pass therebeneath. The trigger arm 25 is urged rearwardly by means of a leaf spring 35 mounted on the previously described bracket 24.

A rearwardly extending flexible tubular leader 36 is secured to the rear end of the housing 10 by means of a connecting collar 37, and which leader is provided with a reciprocating wire 38 therethrough for operating animated artificial lures, to be described. The end of the reciprocating wire 38 within the housing 10 is secured to a crank arm 39, which, in turn, is pivotally connected with a driven gear 40 by means of a crank pin 41. The driven gear 40 is mounted on a stub shaft 42 secured to the base plate 11 and meshes with the first described gear 18.

A suitable artificial lure may be connected with the extending end of the reciprocating wire 38, and as shown in Figures 1 and 5, such lure may be in the form of a flexible animated minnow 43. The minnow shown is comprised of a minnow shaped body 44 having transverse parallel V shaped grooves 45 formed in one side thereof and extending substantially to the opposite side. The body 44 is made of a flexible material, and the grooves 45 are covered with a thin layer of flexible material or cover 46. A longitudinal opening 48 extends through the minnow body 44 and along the side thereof adjacent the flexible covering 46, for receiving the reciprocating wire 38 and which wire is secured to a transverse pin 49 in the tail end of the minnow. A suitable hook 50 is attached to the minnow body 44.

Another form of artificial lure for use in connection with the invention is shown in Figure 6 wherein a body 51 has substantially the shape of a shrimp, and like the described minnow 43, is made of a flexible material such as soft plastic. Transverse V shaped grooves 52 are formed in the tail portion of the body 51 and the described reciprocating wire 38 extends throughout the length of the body 51 and the transverse grooves 52, where it is secured to a transverse pin 53. The forward end of the body 51 is provided with a collar 54 which is attached to one end of the previously described flexible tubular leader 36. Preferably, the body 51 of the last described bait is provided with a cavity 55 so as to cause the lure to float. A hook 56 extends outwardly from the cavity 55 and beneath the body 51 in any suitable manner. Flexible legs 57 may be provided integral with the body 51, further simulating a shrimp or the like.

The form of the invention illustrated in Figure 7 includes a hollow body or housing 58 having a drum 16 and trigger arm 25', together with related parts, as previously described. Instead of a bracket 24 for mounting the trigger arm 25', a pin 59 is provided through the housing 58. The line 20 from the casting rod 21 enters the forward end of the housing 58 through an opening 60, and in all other respects the described drum construction 16 and trigger arm 25', together with its associated parts, are the same as previously described except that a coil compression spring 61 is provided between the inner surface of the forward end of the hollow body 58 and the trigger arm 25' instead of the leaf spring 35 as shown in Figure 2. The driven gear 40 is connected with pivoted legs 62 extending outwardly from the body 58 by means of a connecting arm 63 which, like the previously described connecting arm 39, is pivotally connected with the driven gear by means of a crank pin 64. A suitable hook 65 is attached to the body 58.

In operation, the line 29 of the casting rod 21 is reeled in causing the housing 10 or 58 to engage the outer eye 66 of the casting rod. Continued reeling in causes the trigger arm 25 to move forwardly and to allow the projecting stops 31 to pass rearwardly of the trigger arm shoulder 25, thus winding the spring 22. Upon releasing the line 20, the trigger arm spring 35 or 61 moves the trigger arm 25 rearwardly causing the shoulder 30 to engage one of the projecting stops 31. The artificial lure 43 or 51 is then cast in the usual manner and the initial tension thus applied to the line 20 may release one or more of the stops 31 from the trigger arm shoulder 30, but since the tension is temporary, the arm 25 engages another of the stops 31, thus allowing the lure to lay on the water with the drum 16 wound against the tension of the spring 22. After waiting a length of time, tension is applied to the line 20 by a jerking motion, causing the trigger arm 25 to release the stop 31 it is holding, and by reason of the movement of the arm 25 and the assumed positions of the shoulder 30 and the finger 32, several of the stops are allowed to pass under the arcuate bend 34 before the same reengages one of the stops. The resulting rotation of the drum 16 turns the driven gear 40, which in turn, applies reciprocating movement to the wire 38 connected with the lure 50, 51, or the legs 62 of the modified form of the invention. Several such releasing actions may be applied by means of a line 20 before the spring 22 becomes completely unwound. The line 20 is then reeled in in the usual manner, and the spring 22 is rewound by continued reeling in of the line.

The invention is not limited to the construction herein shown and described, but may be made in many ways within the scope of the appended claims.

What is claimed is:

1. In a mechanism for imparting animated motion to an artificial fish lure the combination of a spring actuated drum, projections extending from said drum, a pivotally mounted trigger arm having a shoulder thereon arranged to engage said projections, said arm including an eye in the free end thereof, a line extending through said eye and around said drum, and means adapted to be connected with said drum imparting movement to said fish lure.

2. In a mechanism for imparting animated motion to an artificial fish lure as defined in claim 1, the construction wherein said means adapted to be connected with said drum imparting movement to said fish lure includes a gear forming a part of said drum, a driven gear coacting with the first said gear, and a crank arm pivotally connected with said gear.

3. In a mechanism for imparting animated motion to an artificial fish lure as defined in claim 1, the construction wherein said means adapted to be connected with said drum imparting movement to said fish lure includes the construction wherein said trigger arm includes a shoulder arranged to engage said projections, and a finger mounted on said arm and spaced from said shoulder for permitting said projections to pass therebetween.

4. The combination of a fish lure and mechanism for imparting animated motion thereto comprising a housing, a spring actuated drum mounted within said housing, projections extending from said drum, a pivotally mounted trigger arm having a shoulder thereon arranged to engage said projections, said arm including an eye in the free end thereof, a line extending through said eye and around said drum, a gear driven by said drum, a flexible tubular leader connected with said housing, a flexible artificial lure connected with said tubular leader on the end thereof opposite said housing, a wire extending through said tubular leader and a crank arm connected with said gear and the end of said wire within said housing, said wire being connected to said lure and acting to impart movement thereto.

5. The combination of a fish lure and mechanism for imparting animated motion thereto comprising a base plate, a spring actuated drum supported by said base plate, projections extending from said drum, an escapement pivotally mounted on said plate and positioned for coaction with said projections, a fish line slidably positioned through said pivotally mounted escapement for coaction therewith and wound on said drum, an oscillating member supported by said plate, and means connecting said drum and said oscillating member for imparting movement to the latter.

References Cited in the file of this patent
UNITED STATES PATENTS

| | | |
|---|---|---|
| 543,479 | Harrison et al. | July 30, 1895 |
| 545,958 | Hoffmann | Sept. 10, 1895 |
| 726,021 | Bryan | Apr. 21, 1903 |
| 1,401,096 | Neudeck | Dec. 20, 1921 |
| 1,465,707 | Bartholomew | Aug. 21, 1923 |
| 2,303,668 | Tilbury | Dec. 1, 1942 |
| 2,418,527 | Riggan | Apr. 8, 1947 |
| 2,577,553 | White, Jr. | Dec. 4, 1951 |